(12) United States Patent
Roy et al.

(10) Patent No.: US 7,936,787 B2
(45) Date of Patent: May 3, 2011

(54) TECHNIQUE FOR DATA COMPRESSION BY DECODING BINARY ENCODED DATA

(75) Inventors: Satyajit Roy, Gaithersburg, MD (US); Roderick Ragland, Bethesda, MD (US); Douglas M. Dillon, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 3020 days.

(21) Appl. No.: 10/387,177

(22) Filed: Mar. 12, 2003

(65) Prior Publication Data
US 2003/0174732 A1    Sep. 18, 2003

(51) Int. Cl.
*H04J 3/00* (2006.01)
(52) U.S. Cl. ....... 370/476; 370/465; 341/52; 379/93.08; 709/246
(58) Field of Classification Search ............ 341/51, 341/52; 370/395.6–65, 465, 466, 472, 476; 379/93.08; 380/269; 709/231, 232, 236, 709/246
See application file for complete search history.

(56) References Cited

U.S. PATENT DOCUMENTS

| | | | | |
|---|---|---|---|---|
| 5,623,600 A | * | 4/1997 | Ji et al. ............................ | 726/24 |
| 5,889,943 A | * | 3/1999 | Ji et al. ............................ | 726/22 |
| 5,949,355 A | * | 9/1999 | Panaoussis ....................... | 341/51 |
| 6,092,101 A | * | 7/2000 | Birrell et al. .................. | 709/206 |
| 6,115,384 A | * | 9/2000 | Parzych ......................... | 370/401 |
| 6,148,277 A | * | 11/2000 | Asava et al. .................... | 703/22 |
| 6,408,336 B1 | * | 6/2002 | Schneider et al. ............. | 709/229 |
| 7,222,228 B1 | * | 5/2007 | Stephens et al. ................. | 713/1 |

FOREIGN PATENT DOCUMENTS

| EP | 813150 A2 * 12/1997 |
|---|---|
| EP | 1696572 A1 * 8/2006 |

OTHER PUBLICATIONS

"Fourelle's Venturi Compression Technology Adopted by Wireless Internet Industry Leaders," Business Wire, Oct. 1997, pp. 1-4.*
Border, J. et al., "Performance Enhancing Proxies," Internet Engineering Task Force, draft-ieft-pilc-pep-00.txt, Jun. 1999, pp. 1-27.*

* cited by examiner

*Primary Examiner* — Donald Mills

(57) ABSTRACT

This disclosure relates to the transmission of binary data over a network between a transmission host and a receiving host. The transmission host receives packets of data including data in a first format which may be ASCII formatted and contain 6 bits-per-byte words, and including data which had an original binary format containing greater than 6 bits-per-byte words (such as 8 bits-per-byte) and which has been encoded (such as Uuencoded) to 6 bits-per-byte words. The transmission host searches the packets and identifies the encoded data and reverse codes the encoded data to its original binary format, before transmitting the data on a suitable network transmission media that can transmit both ASCII formatted data and data having greater than 6 bit-per-byte formats. The transmission host also includes an application packet demultiplexer for separating the incoming data according its application such as HTTP, NNTP, FTP, etc. The transmitting host includes an identifier in the packets for identifying the reverse coded data. The receiving host responds to the identifier and may encode the previously reverse coded data.

3 Claims, 7 Drawing Sheets

TECHNIQUE FOR DATA COMPRESSION BY DECODING BINARY ENCODED DATA

This application claims priority to application Ser. No. 09/258,783 filed on Mar. 1, 1999

BACKGROUND OF THE INVENTION (a) Field of the Invention

This invention relates generally to reverse coding of encoded binary files prior to transmission on the Internet, to reduce the bandwidth needed for such files.

(b) Description of Related Art

The explosive growth and use of the Internet has resulted in an ever-increasing need for network bandwidth. The use of data compression techniques has reduced the amount of bandwidth required for transmission of a file and it has improved the performance of communication networks. At the present time, most web based applications use compression technology to more efficiently transfer data over the Internet, using techniques such as the algorithms based on the work of J. Ziv and A. Lempel. Unfortunately, when such information is encapsulated within NNTP, for example, the binary form of such information is ASCII encoded, and such encoding expands the amount of transmitted data by as much as 35%. It will be apparent that there is still a need for more bandwidth particularly in wireless networks where bandwidth is limited, and it is important to utilize the available bandwidth in an efficient manner.

One factor in the increased use of available bandwidth has to do with the Uuencoding of certain binary data. During the early days of the Internet, the only use of mail and news consisted of the exchange of simple textual messages composed of ASCII characters which have 6 bits-per-byte words The NNTP and SMTP protocols, which define how messages are exchanged over the Internet, were defined to handle only ASCII formatted words. Unfortunately, those protocols alone were unable to properly transmit 8 bit binary data such as graphic images, compressed data files, spreadsheets, programs or documents generated by word processors, etc.

To enable the inclusion of 8 bit binary data in news and mail messages without the need for a modification of all the news servers and clients on the net, algorithms were developed for transforming or encoding 8 bit-per-byte files into 6 bit-per-byte files formats, and vice-versa. One of the most widely used encoding schemes used in UNIX, Windows, MicroSoft-DOS, Macintosh, and other operating systems is the Uuencode utility. Uuencode stands for Unix-to-Unix encode. It is an ASCII (or text) base binary encoding protocol used on the Internet to transfer binary files across multiple operating system platforms.

The Uuencode and Uudecode utilities are used to transmit binary files over transmission mediums that cannot handle 8 bit-per-byte binary word formats. Unfortunately, the major drawback of Uuencoding is that the encoded form of the file is expanded, as previously mentioned, by as much as 35% (because 3 bytes become 4, plus additional control information). However, in many wireless and terrestrial networks, the encoding of such binary files is unnecessary and expensive (with respect to the need for network bandwidth).

A research program has shown that approximately 40% of the reviewed Internet traffic volume is Internet Network News. The Internet Network News uses the NNTP application protocol to send and receive network news articles and image files. An experiment was conducted wherein NNTP data packets were captured and compressed using several Ziv and Lempel based compression algorithms. The overall results of the experiment yielded a disappointing compression result of 1:1.01. The main reason for the poor compression result is that the original data had already been compressed. Consequently, any further attempts to compress the data would result in little improvement. Hence, as more end-user applications compress their binary content prior to transmission, the less effective are intermediate processing gateways in further compressing the data.

OBJECT OF THE INVENTION

It is a general object of the present invention to provide improved apparatus and method for decreasing the needed amount of bandwidth by searching data prior to transmission for encoded data, and, when the transmission media can accept 8 bit data, converting such data back to its original binary form. The invention is thus able to recapture the benefits of compression and to use the transmission media efficiently, by converting an ASCII encoded file back to its original binary format while transmitting between end-user terminals. It is a further object to provide means for indicating in the transmitted data when reverse coding has occurred and providing means at a receiving terminal for again encoding the data. A still further object is to provide means for near optimum compression in a stateless fashion wherein each packet is compressed and decompressed by itself without regard to the history of other packets.

SUMMARY OF THE INVENTION

Apparatus in accordance with this invention comprises means for receiving data and searching the data for encoded binary files, and means for converting such encoded binary files to its original binary format prior to transmission on a suitable transmission media. The apparatus includes means for identifying where in a TCP/IP packet to decode and for informing a receiving terminal where to encode. The invention further comprises means for converting ASCII formatted packets into binary and vice versa, without maintaining histories of other packets.

The invention further comprises a method of searching and converting binary data utilizing apparatus in accordance with the invention.

BRIEF DESCRIPTION OF THE DRAWINGS

The invention will be better understood from the following detailed description taken in conjunction with the accompanying figures of the drawings, wherein.

DESCRIPTION OF THE PREFERRED EMBODIMENTS

Figure 1:
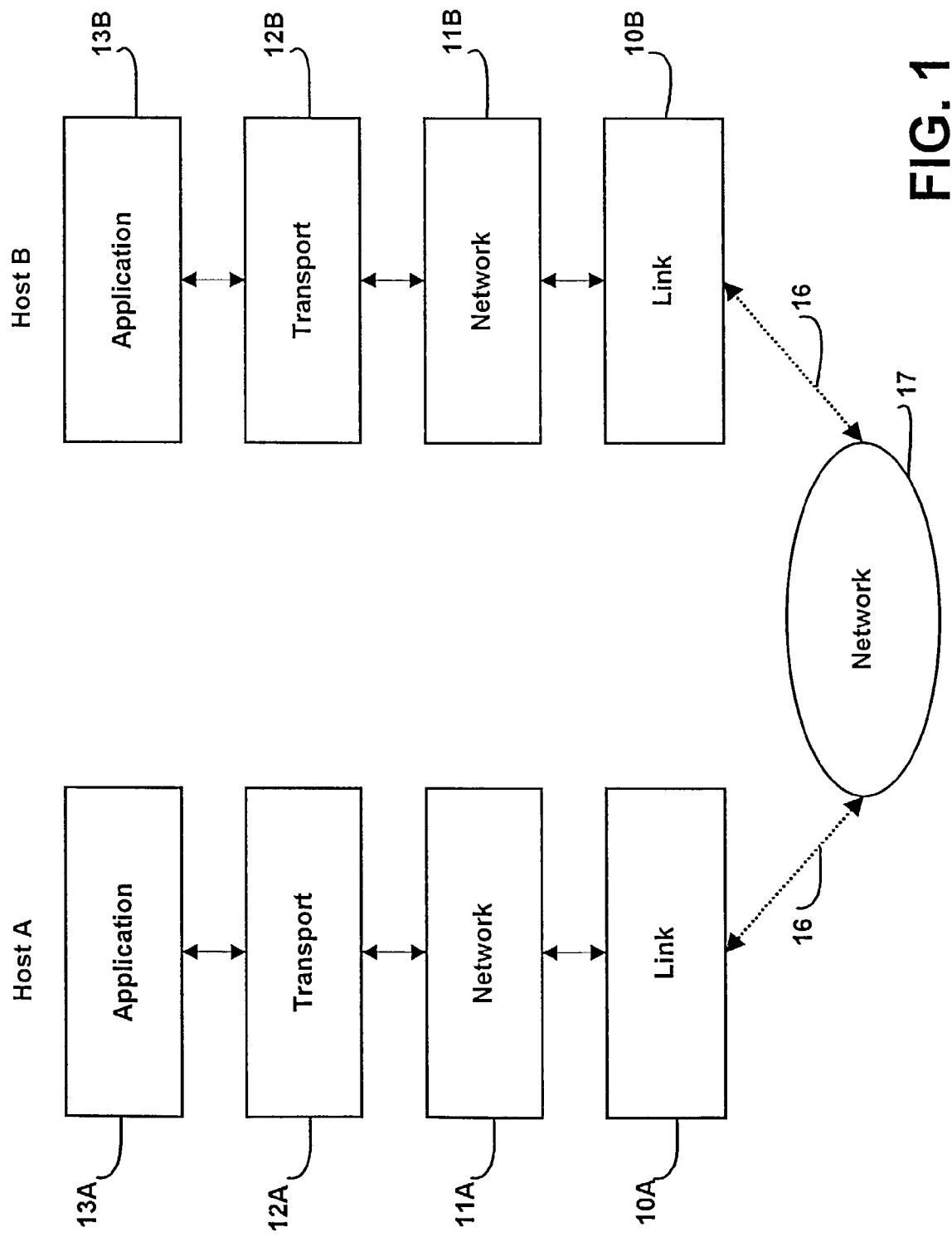
FIG. 1 shows a conventional system and illustrates the layering functions of a networking protocol.

FIG. 1 illustrates a portion of a typical Internet Network, including two host computers labeled Host A and Host B.

Each host computer includes networking protocols which comprises several layers, each layer being responsible for a different facet of the communication sequence. FIG. 1 illustrates, as a specific example, the Transmission Control Protocol/Internet Protocol (TCP/IP) which is comprised of four conceptual layers which build on a fifth layer of hardware. Each layer has a unique and different responsibility, and the terminology herein refers to the TCP/IP protocol suite. The invention is also applicable to other networking protocols such as the ISO protocol which has a seven-layer scheme.

In FIG. 1, the TCP/IP protocol suite of Host A includes a link layer 10A which comprises the device driver in the operating system and the corresponding network interface card in the computer. Together they handle all the hardware details of physically interfacing with the transmission media 16 which may be cable or some other transmission type. A network layer 11A handles the movement or routing of packets around the network 17. A transport layer 12A provides a flow of reliable data between the two host computers, for the application layer 13A. In the TCP/IP protocol suite there are two transport protocols: the TCP (Transmission Control Protocol) and the UDP (User Datagram Protocol). The application layer 13A handles the details of a particular application such as web browser, news and email applications.

The protocol suite of computer Host B includes four similar layers which are given the reference numerals 10B, 11B, 12B and 13B.

An important element in application specific compression is the ability to classify TCP/IP packet types based upon the upper layer application used to produce the packet. Each TCP packet contains a source and destination port number to identify the sending and receiving application. These two values, along with the source and destination IP addresses in the IP header, uniquely identify each connection. Both TCP and UDP identify applications using 16-bit port numbers. Servers are normally known by their well-known port number. For example, every TCP/IP implementation that provides a File Transfer Protocol (FTP) server provides that service on TCP port 21 for control and port 20 for data. Every Network News Transport Protocol (NNTP) server is on TCP port 119.

Figure 2:
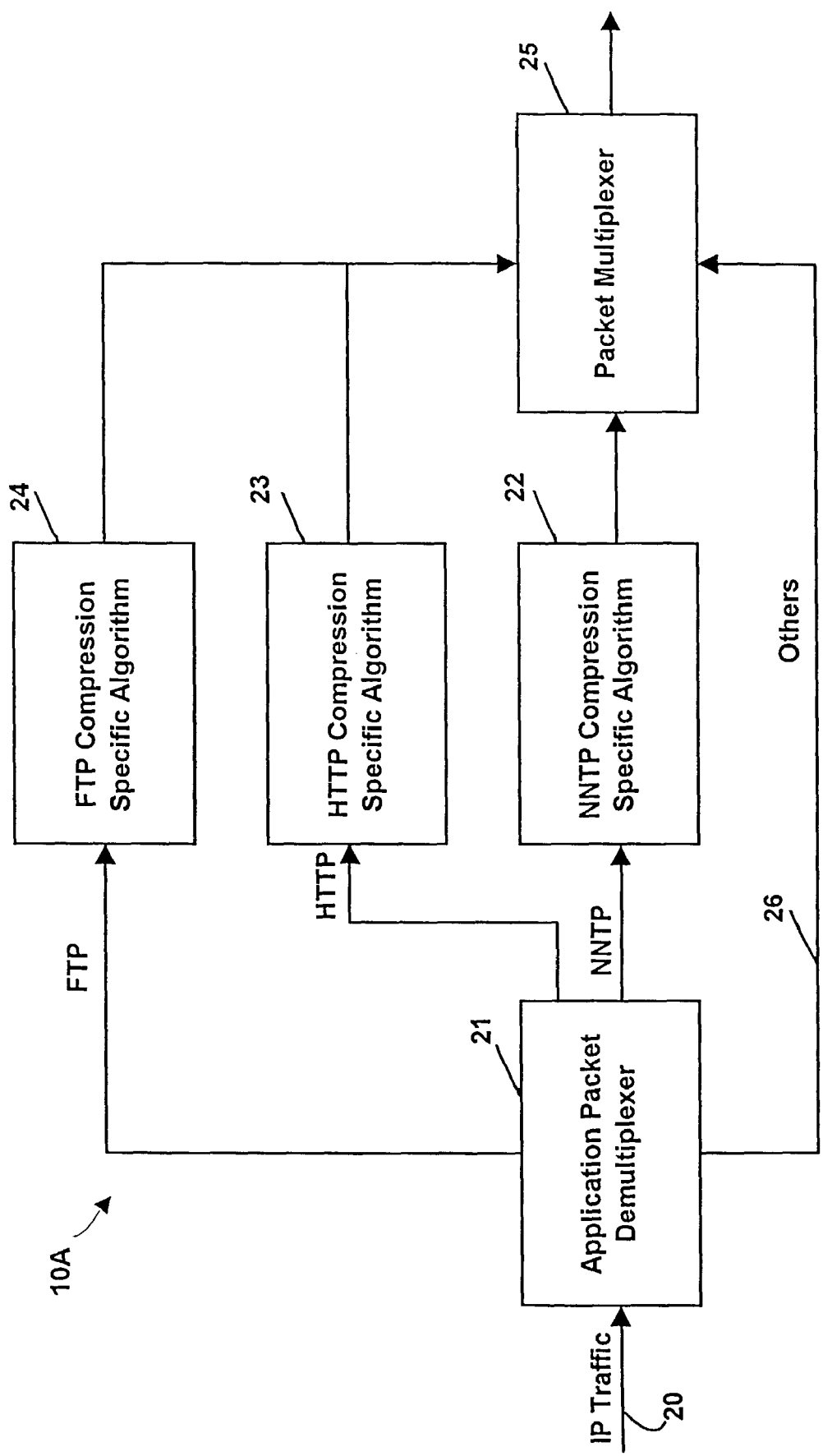
FIG. 2 shows a TCP/IP application packet demultiplexer in accordance with this invention.

The IP traffic (such as FTP, HTTP and NNTP traffic) received on a line 20 (FIG. 2) from the network layer 11A (FIG. 1) of the transmitting host A is sent to the link layer 10A to transmit. In accordance with the present invention, at this stage (in the link layer 10A) the packets are routed to an Application Packet Demultiplexer 21 where the traffic is classified and separated based upon the port numbers which, as noted above, identify the applications, and the traffic is separated based upon the upper layer applications. For example, NNTP traffic is directed to a unit 22 containing an NNTP compression specific algorithm to be described in detail in connection with FIG. 6; HTTP traffic is directed to a unit 23 containing an HTTP compression specific algorithm; and FTP traffic is directed to a unit 24 containing an FTP compression specific algorithm. In each of the units 22, 23 and 24, the data are then processed by an algorithm best suited for the traffic type, and then directed to a packet multiplexer unit 25. Other types of traffic are directed on a line 26 directly to the unit 25. Those packets that have been processed suitably indicate that fact in the IP header, or give notice in some other manner to the destination system (the receiving host B) which receives the packet.

Figure 6:
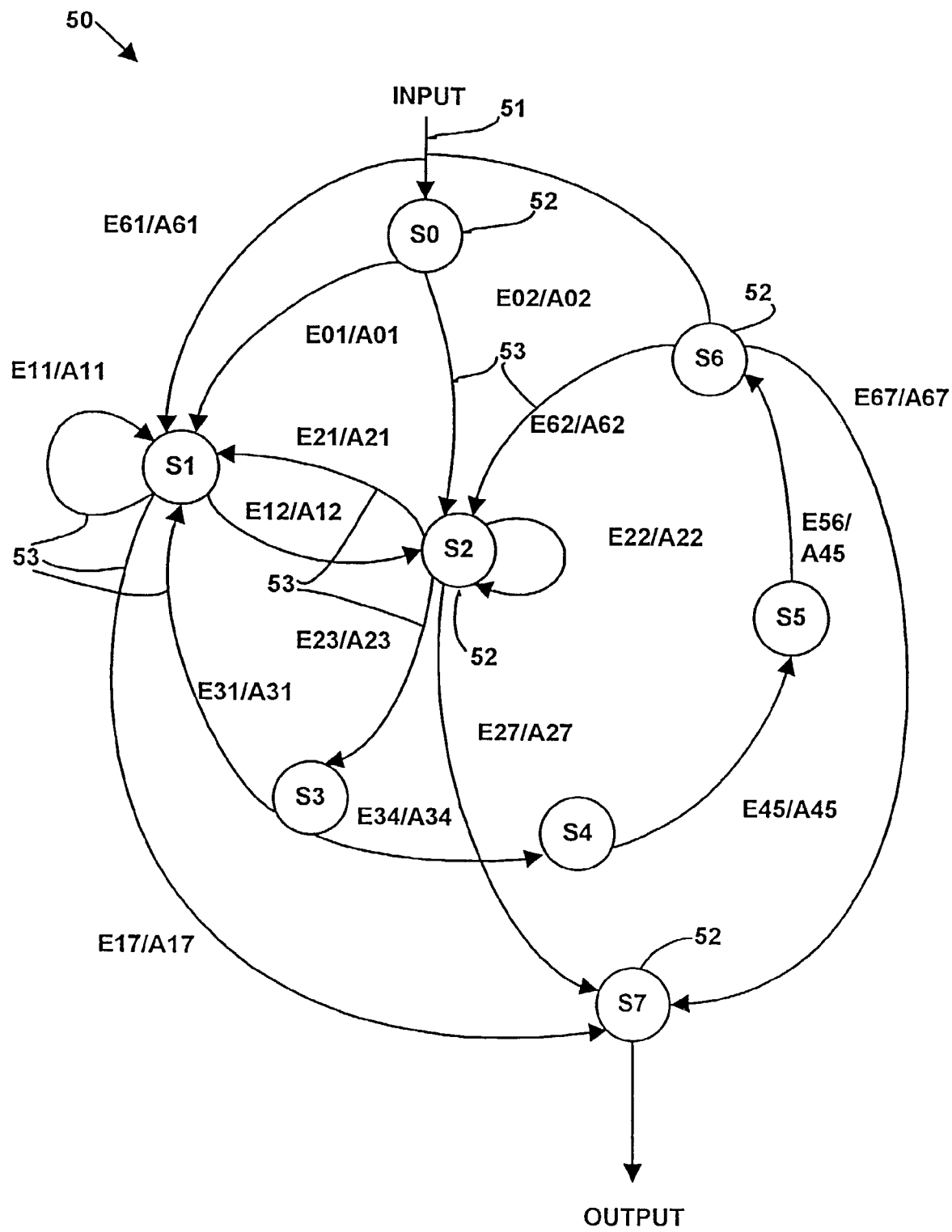
FIG. 6 is a diagram illustrating a packet parsing system in accordance with this invention.

In the specific example described herein, the link layer on the transmit side includes (in each of the units 22, 23 and 24) a Finite State Machine (FSM) such as the FSM shown in FIG. 6. Each FSM is specifically designed for the application routed to the units 22, 23 and 24. The FSM of FIG. 6, for example, is specific to NNTP traffic and is in the unit 22.

As previously mentioned, data moving from Host A, for example, to the Internet may include textual messages composed of ASCII characters (6 bits-per-byte words), and data which was originally in a greater than 6 bit-per-byte format (such as an 8 bit-per-byte file) and which has been encoded from its original form to a 6 bit-per-byte format. However, many transmission media are capable of transmitting information in the 8 bit-per-byte format, and consequently the encoding to the 6 bit-per-byte format is unnecessary and undesirable because it increases the required amount of transmission bandwidth.

It is an important feature of the present invention that the encoding of the original 8 bit-per-byte data may be reversed at the transmitting source (such as Host A) before the data are placed in the Network. Later, if desired or necessary, the encoding may be reinstated at the receiving end (such as Host B).

Figure 3:
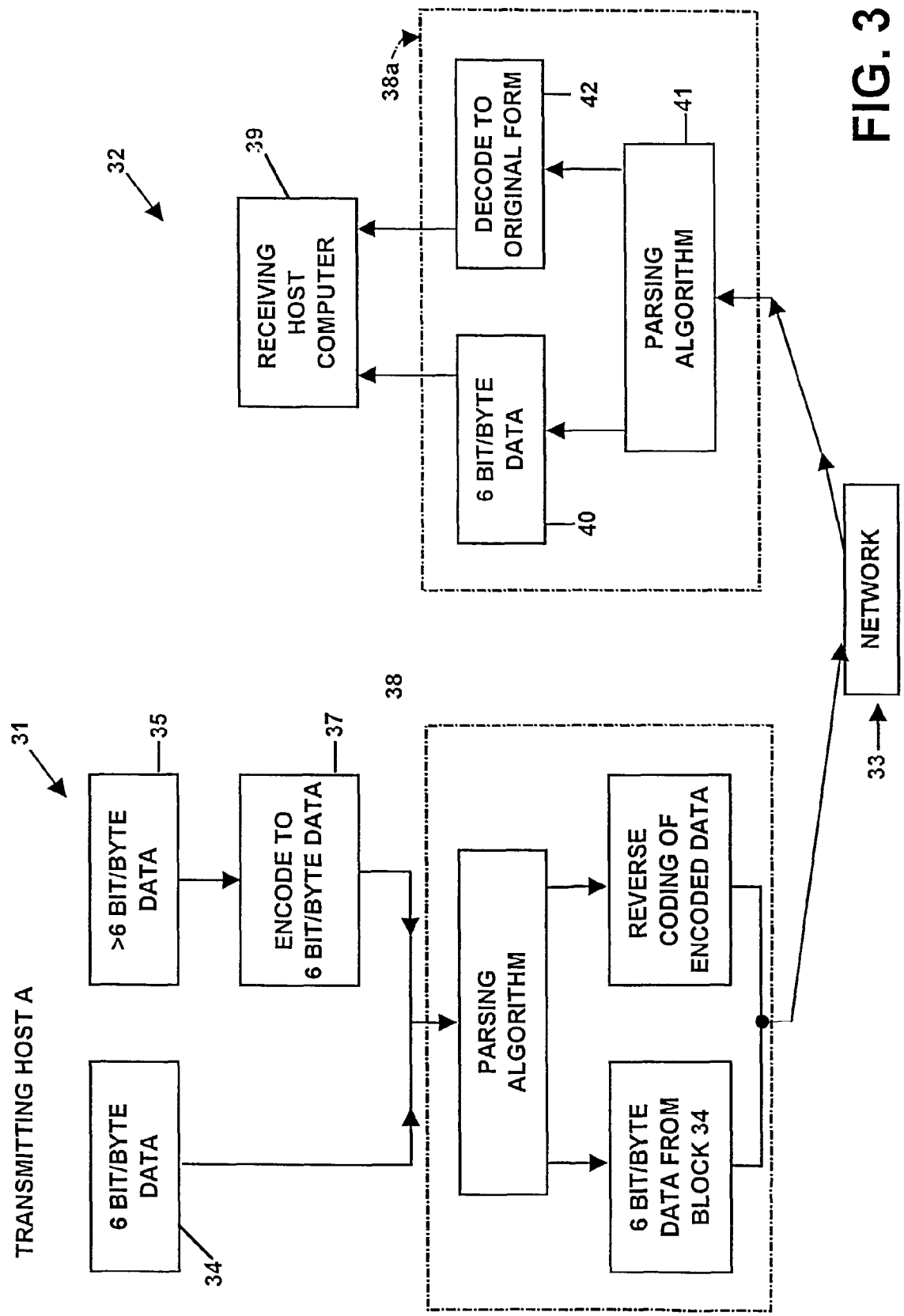
FIG. 3 is a block diagram showing a system in accordance with this invention.

FIGS. 3 and 6 show apparatus and method for reversing the encoding at the transmitting source. The specific example of the invention illustrated and described deals with an 8-bit binary data, NNTP file that has been Uuencoded (Unix-to-Unix encoded); in other words, it deals with a file that was created in 8 bit-per-byte binary format and that was encoded to a 6 bit-per-byte ASCII file.

A primary feature of the invention comprises an NNTP (in this specific example) command line parsing algorithm, which searches a TCP/IP packet payload news protocol for binary files that are Uuencoded. The NNTP protocol comprises an ASCII text with Uuencoded binary files that are of the form:

begin <mode><filename>
<binary encoded ASCII Text>
end where, <mode> is the file's read/write/execute permissions as three octal digits, and <filename> is the name to be used when recreating the binary data. There is also a Uudecode program which reverses the effect of the Uuencode program and recreates the original 8 bit binary file exactly.

The Uuencode algorithm works by taking a group of three bytes, adding trailing zeros if there are less than three bytes left, and placing them into a 24-bit buffer. The 24-bits are split into four groups of 6-bit words, which are treated as numbers between 0 and 63. Decimal 32 is added to each number and they are output as ASCII characters which lie in the range from 32 (which represents a space) to 32+63=95 (which represents an underscore). Each group of sixty output characters (corresponding to 45 input bytes) is output as a separate line proceeded by the character "M" (in ASCII code it is 77=32+45). At the end of the input, if there are N output characters left after the last group of sixty, and if N>0, then the character whose code is 32+N will be at the beginning of the line. Finally, a vacant or single space line is outputted, followed by a line containing only the word "end".

The following is an example of an Uuencoded file as described above:

begin 644 rfc822.txt
M4F5C96EV960Z(&)Y(&-C;6%I;"!F<F)M
  (&AA8v=A=&4N15,N2$%#+D-/30T*    M1G)O;
2!M:V                %N;F%N0&AN<RYC;VT-
"E@M16YV96QO<&4M1G)O;3H3H@;6MA;FYA
M;D!H;G,N8V]M#0I296-E:79E9#H@9G)0;2!H;G-
S>7-A+FAN<RYC;VT@*%%LQ    M,SDN#4N-3(H,
3'P72D@8GD@:%%C9V%T92Y%4RY(04,NOT]-
("@X+C<N-B\X               M+C<N,RD@=VET:
"!%4TU44"!I9"!,04$P,%!.3%F;W(@*$`O'9B87)A:

F%S0$-#M1T%412Y(04,N8V]M/CL@5'5E+"'R-"!-87(@,3DY."'Q,3HP,#HR,'M,#@P            M,"'H4%-4'0T*4F5C96EV960Z(&9R;VT(@<&5S,3(N&YS+F-O;2'H&9R;VT(&;HS,3(N&YS+F-O;2!,,3,T+H+C@U+C$R"XQQ0,3-===*0T*("'@(&)Y(&AN<W-Y<V$N:                                                    &YS                 M+F-O;2'H."XX+C<O."XX+C<<I('=I=&@@@@15--5%@:60@3T%!,#H@R,3,[#H@M("'@5'5E+'R-"!-87((@,3DY."'Q-#HP,#Hw2'M,#4P,,''15-4*0T*4F5C          M96EV960Z("AM:V%N;;;&%N0O0O8V%<:&]S=$$S(3N&YS+F-O;2!H M."'XW+C$R M."'XV+C$y"!*,#gcbdw+>$PM("'@5TL@5'5E+'R-"!-87((@,3DY."'Q            M-#HP,#Hw2'M,#UP,,''15-4*0t*KA:6xgRZD!H;G,N8V]M("A-86YY86xbd$MA;FyBD-"DUE<W-A9V4tM260Z(#PY."'S,C0Q-"#'C'N6DtrM-S<Q0'!E<S$R+FFAN<RRYC:; VT^#0I$871E.B!4=64L(#(0(T($$%A'Q'E($M("'P"P(P("'TP-3'3'P#'0q8+4$A:6QE0E<CH@6EU<-86EE(("'@T+"'N&YS,+,'N8ElA;Fy@M*0T*5&gcbdw      M*0T*5&5\Z('9B87)A:F %S0$-#1T              %412Y(04,N8V]M##013=6)J)96-  T.B!D96UO                I=&5N="U4>7!lE.B!T97XT+                  W!L86dEN.R!C:&%R<V5T/V5T/75S+6%S8%EI#0H'                                  end
In the foregoing specific example, the first line of the coded file contains the word "begin'" followed by the number 644 which represents the mode, and then the file name. Each of the next lines starts with the letter M and contains 60 characters. The last line of the file starts with the letter 'I'; then there is a space (or blank line) followed by the word "end".

At the transmitting station or terminal, the NNTP binary file-parsing algorithm (see FIG. 6) in the unit 22 searches outgoing packets for Uuencoded binary files. When a Uuencoded file has been detected, the transmitting station converts the ASCII encoded data into a binary stream. In addition, a special control word is inserted at the beginning of the compressed byte stream to indicate to the receiving station where the conversion process occurred, so that the receiver can convert the binary content back into the ASCII form.

Figure 4:
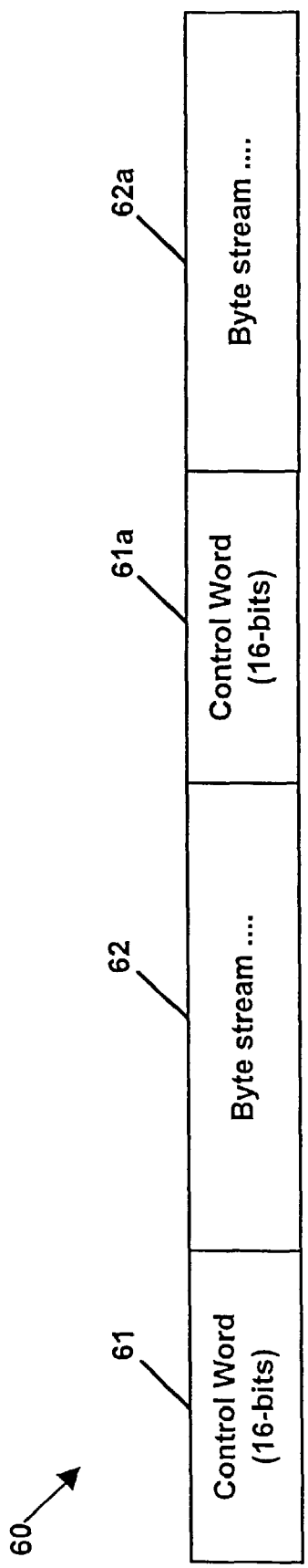
FIGS. 4 and 5 show the structure of packets of reverse coded binary files of a system in accordance with this invention.
Figure 5:
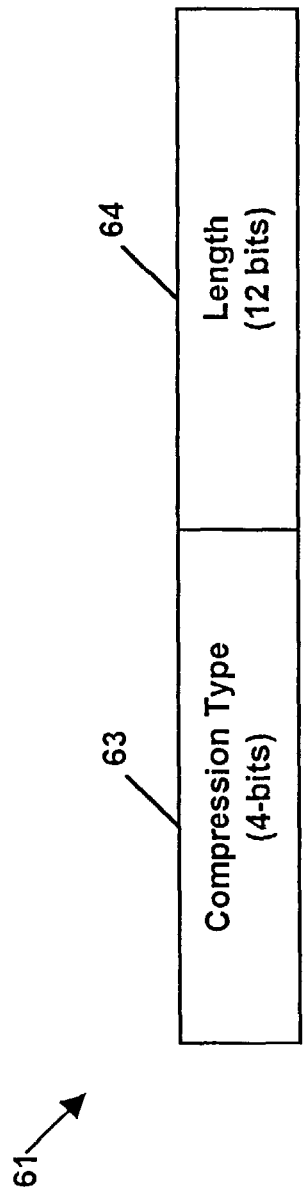

FIGS. 4 and 5 show a typical example of a compressed NNTP packet structure. Each packet 60 includes a byte stream 62, 62a, etc. preceded by a control word header 61, 61a, etc., as shown in FIG. 4. FIG. 5 shows the two-octet control word header 61 which includes a section 63 (4 bits) that identifies the compression type, and a section 64 (12 bits) that identifies the length of the byte stream.

Moreover, the Compression Type field 63 in the Control Word (CW) 61 may also be used to indicate to the receiver terminal the use of different compression algorithms or no compression of the byte stream. The CW will appear immediately after the IP header, with the Compression Type or no compression and length. Following the CW would be the stream of uncompressed bytes with a length given by the CW. At the end of this stream, another CW would appear, which would indicate a compression of type Uudecode, followed by the Uudecoded binary data. An example of this manner of use of the CW is given below in connection with FIGS. 7, 8 and 9.

FIG. 3 is a block diagram of a system including apparatus in accordance with this invention. The system includes a transmission site or host 31, a receiver site or host 32, and a network 33 which is coupled to both hosts 31 and 32 as well as, in most instances, numerous other hosts or sites (not shown for the sake of simplicity). It should be understood that each of the hosts may, on different occasions, function as a transmission host and/or a receiving host.

The host 31 includes, in this specific example, a source 34 of six bits/byte data and a source 35 of greater than six (such as eight) bits/byte data. A conventional encoding unit 37, such as a Uuencode utility, receives the output of the source 35 and encodes it to a six bits/byte file such as that described above. The block 38 represents apparatus in accordance with this invention, and includes the apparatus shown in FIGS. 2 and 6. Further, the block 38 is included in a link layer of a network such as the network shown in FIG. 1. The block 38 receives the data from both sources 34 and 35, separates the encoded files from the 6 bit-per-byte files, reverses the coding of the file received from the unit 37, and sends all of the files to the network 33.

The receiver 32 receives the files over the network 33. A unit 41 is provided which separates the reverse coded data from the six bits/byte data of the source 34 and passes the six bits/byte data to a unit 40 and then directly to the receiver computer 39. The reverse coded files are again Uuencoded in a unit 42 before being passed to the receiver host computer 39.

FIG. 6 and the following discussion relate to the structure and operation of the block 38 in FIG. 3. FIG. 6 shows a finite state machine (FSM) 50 diagram of the NNTP binary file-parsing algorithm. The parsing algorithm searches within the NNTP protocol for and identifies encoded binary files for the purpose of reversing the coding process. The input 51 (received from the units 34 and 37 in FIG. 3) into the FSM 50 is the payload of the TCP packet that contains the NNTP protocol and the output is the binary equivalent of the ASCII encoded data embedded within the NNTP packet.

The NNTP binary file packet parsing FSM 50 is described by a plurality of states 52 (indicated by the letter S), a plurality of events (indicated by the letter E), a plurality of actions (indicated by the letter A), and control variables. The events E and the actions A are shown as lines 53 in FIG. 6. The transition between states is determined by reading a byte of an input packet and the contents of the appropriate control variable. The following is a description of the functioning of the variables, the states S, the events E and the actions A.

VARIABLES:

| | |
|---|---|
| CHDone - | A Boolean variable determines whether a control header has been added to the output buffer. |
| Mdetected - | A Boolean variable determines whether a valid uuencoded line is detected. |
| Mcontinuous - | A Boolean variable determines consecutive valid uuencoded lines. |
| Counter - | Temporary variable stores the number of bytes read after an M is detected. |

STATES:

| | |
|---|---|
| S0: | Start: Read next byte from input buffer |
| S1: | Non M Byte detected: Read next byte from input buffer |
| S2: | Byte N detected: Read next byte from input buffer |
| S3: | A carriage return detected: Check counter value |
| S4: | Valid number of bytes (60) observed in a line: Read next byte |
| S5: | A line feed detected, decode it: Run uudecode |
| S6: | Next line starts: Read next byte |
| S7: | End of input buffer: Return output buffer and length |

EVENTS:

| | |
|---|---|
| E01, E11, E61: | Byte < >'M' |
| E02, E12, E62: | Byte = ='M' |
| E17, E27, E67: | End of input buffer |
| E21: | Ascii(Byte) < 32 \| \|Ascii(Byte) > 96 |
| E22: | 32 <= Ascii(Byte) <=96 |
| E23: | Byte = = 'CR' (Carriage Return) |
| E31: | Counter != 61, Valid number of bytes in a line not detected |

-continued

| | |
|---|---|
| E34: | Counter = = 61, Valid number of bytes in a line detected |
| E45: | Byte = = 'LF' (Line Feed), valid line to be decoded |
| E56: | Decode done |
| ACTIONS: | |
| A01: | Buff += CW(Control, Length); control = no compression, length = 0;<br>Buff += Byte read;<br>Update CW with length += 1;<br>CHDone = True; |
| A02: | NULL; |
| A11: | Buff += Byte read;<br>Update CW with length += 1; |
| A12: | Initialize counter to 0; |
| A17: | if (!Mdetected) do uncompressed output; |
| A21: | counter++;<br>if (!CHDone)<br>{<br>Buff += CW(Control, Length) with control = no compression, length = 0;<br>CHDone = True;<br>}<br>Mcontinuous = False;<br>Buff += Bytes from M up to the last byte read;<br>Increment CW length with no. of bytes dumped to output buffer; |
| A22, A23: | counter++; |
| A27: | if (!Mdetected) do uncompressed output;<br>else<br>{<br>if (!CHDone)<br>Buff += CW(Control, length) with control = no compression, length = 0;<br>Buff += Bytes from M up to the last byte read:<br>Increment CW length with no. of bytes dumped to output buffer;<br>} |
| A31: | if (!CHDone)<br>{<br>Buff += CW(Control, Length) with control = no compression, length = 0;<br>CHDone = True;<br>}<br>Mcontinuous = False;<br>Buff += Bytes from M up to the last byte read;<br>Increment CW length with no. Of bytes dumped to output buffer; |
| A34, A45: | NULL; |
| A56: | if (Decode is successful)<br>{<br>if (!Mcontinuous)<br>Buff += CW(control, length) with control = compress, length = 0;<br>Buff += uudecoded bytes;<br>Update most recent CW with length += uudecoded length;<br>Mcontinuous = True;<br>Mdetected = True;\|<br>}<br>else<br>{<br>if (!CHDone)<br>{<br>Buff += CW(Control, Length) with control = no compression, length = 0;<br>CHDone = True;<br>}<br>Mcontinuous + False<br>Buff += Bytes from M up to the last byte read;<br>Increment CW length with no. Of bytes dumped to output buffer;<br>} |

The invention may also be used in conjunction with other Ziv and Lempel compression algorithms such as LZ77, LZSS and LZ78 (to name only a few). For example, NNTP applications generate packets that are comprised of ASCII characters. When the binary file-parsing algorithm fails to locate an Uuencode file within an NNTP packet, some other compression algorithm may be used to efficiently compress the packet, such as those referred to above, for example.

Figure 7:
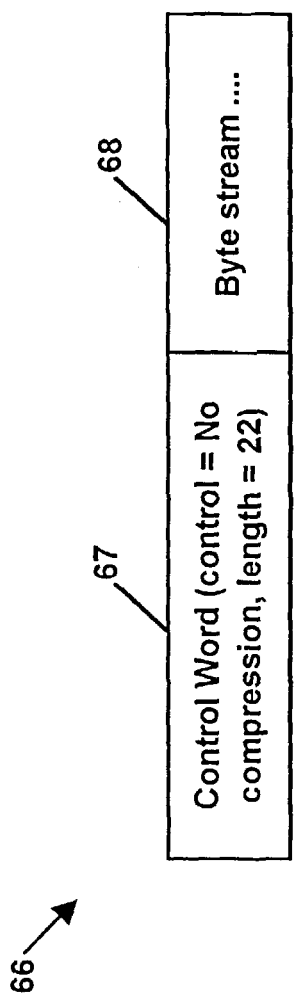
FIGS. 7, 8 and 9 illustrate the packet parsing algorithm.
Figure 8:
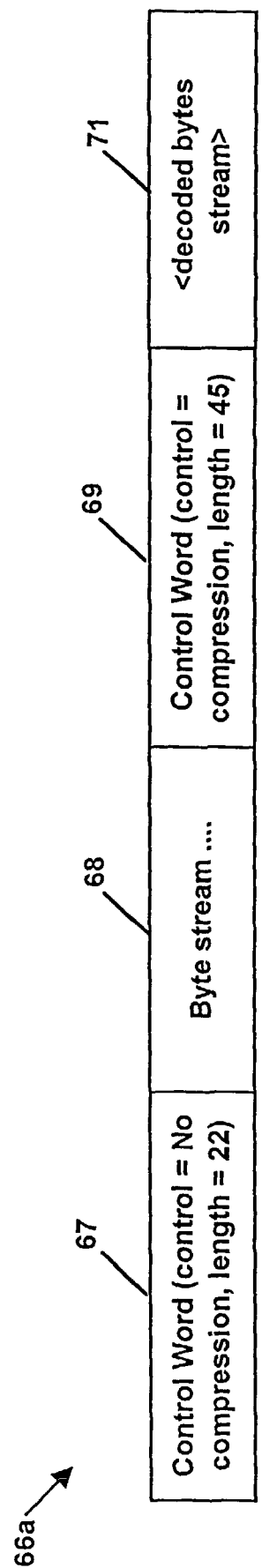
Figure 9:
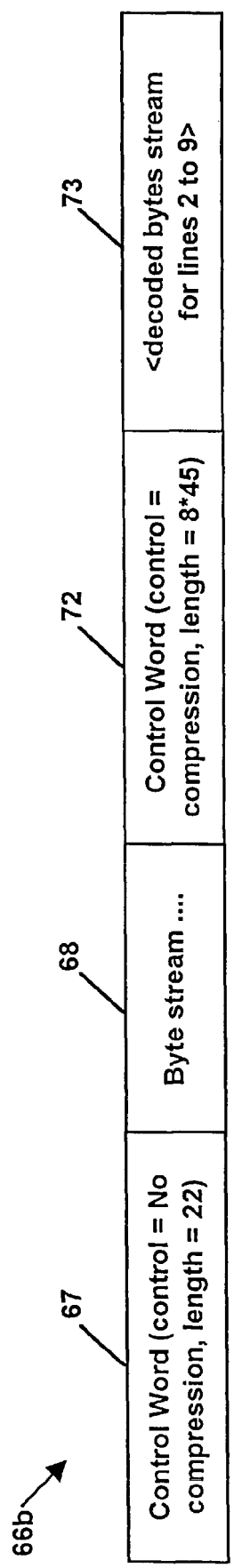

FIGS. 7, 8 and 9 illustrate a specific example of the operation of a system in accordance with the invention. This example illustrates the steps of compressing a Uuencoded NNTP packet. In the specific example given previously herein, of a Uuencoded file, it is assumed that carriage return (CR) and line feed (LF) terminate each line. The NNTP TCP encoding algorithm converts the data as follows. After scanning a NNTP packet, and before the character 'M' is encountered, the resultant output buffer contains the original uncompressed packet contents as shown in FIG. 7. The packet 61 contains a Control Word Header 62 followed by a byte stream section 63. The second line, which starts with the letter 'M' is determined as a valid Uuencoded line and it is decoded to reduce the number of bytes from 60 to 45. After this operation, the output buffer takes the format 61*a* shown in FIG. 8, wherein the header 64 indicates the compression and the length (reduced to 45 bytes), followed by the decoded byte stream section 65. Similar operations are performed on the remaining lines, to produce the output buffer format 61*b* shown in FIG. 9, which includes a header 66 and a byte stream section 67.

At the receiving terminal, a NNTP TCP payload decoding algorithm is executed on the above buffer output to reproduce the original Uuencoded ASCII file. A simplified decoding algorithm is as follows:

1. Scan the output buffer. If a control word header indicates the following data bytes are without compression, then use those byte streams as unchanged ones.

2. Else, run Uuencode on the decoded bytes to get back the original Uuencoded ASCII form.

Thus, the apparatus and method in accordance with the invention comprises a novel technique for searching a TCP/IP packet payload that has encapsulated NNTP Uuencoded ASCII encoded binary files to convert the file back into its original binary form before transmission on the Network 33. Afterward, the receiver 32 may Uuencode the binary data prior to passing the data to the TCP/IP stack. Thus it is possible to recapture the benefits of compression and to use the transmission media efficiently by converting an ASCII encoded file to its original binary format while transmitting between end-user terminals. Since the majority of both wireless and terrestrial networks, along with the gateways through which email and news often passes, are capable of transmitting information in 8-bit bytes, the need to ASCII encode binary data is obviated, and encoded binary data is reversed in accordance with this invention.

The apparatus and method has numerous advantages. The technique is simple, uniform and robust and it does not require special purpose hardware. The technique is compatible with all UNIX, MicroSoft Windows and DOS based applications provided the software implements Uudecoding and Uuencoding, and that binary file parsing is performed at the link layer interface. Further, apparatus and method in accordance with this invention is compatible with the Internet Engineering Task Force (IETF) IP Payload Compression Protocol (IPComp) Internet-Draft. Still further, the technique is suitable for terrestrial wireless and satellite networks: All parameters of the FSM are programmable, and thus it is easy to modify and optimize for specific networks. Still further, it requires very little bandwidth overhead.

In addition, the present invention provides a technique wherein each packet is converted by itself without regard to the history of other packets; this is referred to herein as "stateless compression". By contrast, a process which allows current compression operations to use the history of previous compression operations is referred to as "stated compression". The ability to provide near optimal compression (by converting ASCII into binary and vice versa) without maintaining histories for multiple connections is a very significant and important feature. This capability enables intermediate network processors to incorporate the compression capabilities of this invention at lower complexity and cost. Most of the compression algorithms previously mentioned herein (i.e., Ziv and Lempel based approaches) implement stated compression to achieve optimal performance, where the compression engine maintains separate histories for each data stream. The individual histories are necessary to achieve maximum redundance over multiple data streams, and therefore higher compression ratios in each data stream. However, the compression engine must maintain separate histories for each data stream, and efficiently switch between these multiple histories. Routers, bridges, and network gateways are examples of nodes that execute applications that process multiple streams of data concurrently. These nodes may establish multiple virtual connections and transfer independent data streams over each virtual connection. The increased complexity, and resulting cost, of the compression engine to operate in a stated manner can be significant for equipment such as routers and bridges. Hence, the stateless compression method is best in reducing the complexity and cost of such network equipment.

What is claimed is:

1. A system for compression of data streams received in packets, the packets being produced by different applications and each application producing packets having distinct port numbers, said system comprising:

application packet demultiplexer means for receiving said packets and for separating said packets into different application packet streams, each of said streams being for a different application, a plurality of application specific compression algorithms, each of said algorithms receiving and compressing one of said application packet streams, and packet multiplexer means connected to receive and multiplex said compressed application packet streams.

2. A system as set forth in claim 1, wherein said algorithms comprise an NNTP compression specific algorithm, and HTTP compression specific algorithm, and an FTP compression specific algorithm.

3. A system as set forth in claim 2, and further comprising means connecting said demultiplexer means to said multiplexer means for streams other than said application packet streams.

* * * * *